United States Patent [19]
Callahan

[11] Patent Number: 4,741,016
[45] Date of Patent: Apr. 26, 1988

[54] SPECIAL SERVICE SIGNAL TESTER

[75] Inventor: David W. Callahan, Omaha, Nebr.

[73] Assignee: Independent Technologies, Inc., Omaha, Nebr.

[21] Appl. No.: 926,191

[22] Filed: Nov. 3, 1986

[51] Int. Cl.⁴ .............................................. H04M 1/24
[52] U.S. Cl. ........................................ 379/21; 379/22; 379/27
[58] Field of Search .................... 379/8, 21, 22, 27, 1, 379/9, 26; 324/66, 51, 54

[56] References Cited

U.S. PATENT DOCUMENTS

| | | | |
|---|---|---|---|
| 3,941,950 | 3/1976 | Dunwoodie et al. | 379/21 |
| 3,985,974 | 10/1976 | Jusinskas, Jr. et al. | 379/22 |
| 4,022,987 | 5/1977 | O'Dea | 379/27 |
| 4,292,480 | 9/1981 | Sweatt | 379/21 |
| 4,575,588 | 3/1986 | Vande Vyver | 379/22 |

Primary Examiner—Stafford D. Schreyer
Attorney, Agent, or Firm—Anthony G. Eggink

[57] ABSTRACT

The present invention discloses a unitary and hand held four conductor test apparatus that is designed to provide signaling operation tests on new or existing telecommunication special service circuits. The apparatus is comprised of circuitry which interconnects LEDs, a switching element and connection terminals. The apparatus terminates PBX dial tie trunk or special service circuit signaling leads at a designated "demarcation point" and it is designed to exercise or manipulate the special service circuit's associated line equipment for testing.

18 Claims, 3 Drawing Sheets

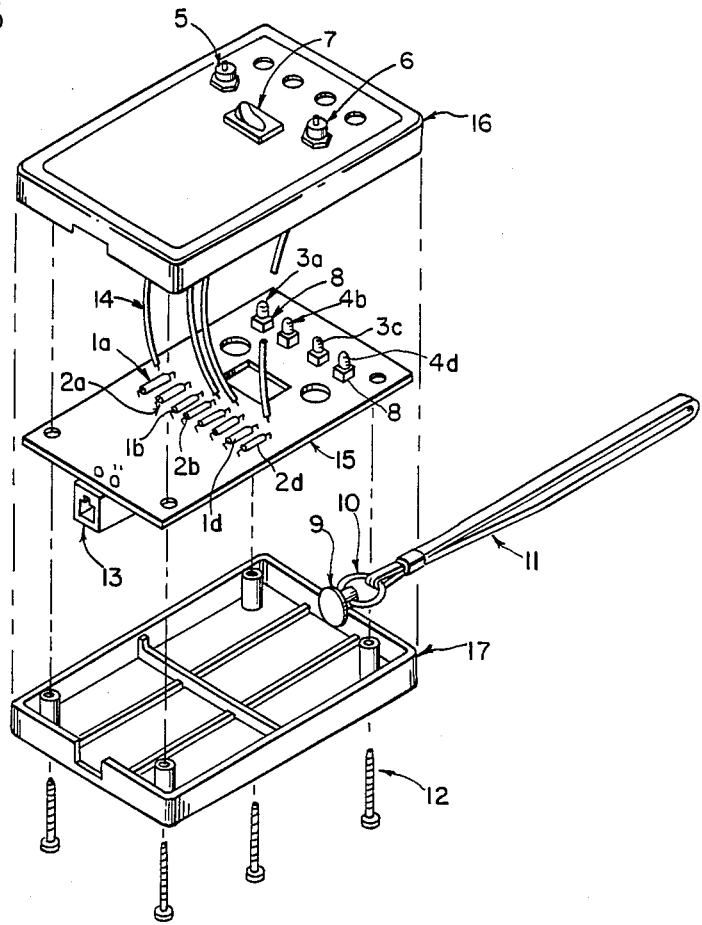

4,741,016

SPECIAL SERVICE SIGNAL TESTER

FIELD OF INVENTION

The present invention relates to testing the signaling on special service circuits, specifically PBX tie lines. However, the invention may be used on any number of other special service circuits.

BACKGROUND OF THE INVENTION

Special service signaling circuits govern the transmission of signals used in private line, two-PBX (Private Branch Exchange) telecommunications systems to perform functions such as supervision (answer and disconnect) and address signaling (dialing) to control the operation of switching machines in the telecommunications system.

The present invention tests special service circuits at a customer demarcation point. Before 1984 there was not a specific need to establish a demarcation point. Due to this absence of need, special service circuits were installed and maintained by their respective companies.

After Jan. 1, 1984 (Bell system divestiture) there existed two classes of providers—(1) the telephone company or carrier interconnect and (2) the premise equipment facility. Precisely because of this (two or more) company arrangement, there had to be a clearly established line of demarcation. At this created demarcation point the companies and their respective circuits were separated and defined as a point of presence.

Soon thereafter, questions concerning installation and maintenance up to this demarcation point began to create responsibility problems. For example, if a customer who owned or leased premise equipment such as PBX experienced special service circuit trouble, there could be a question concerning the trouble responsibility—telephone company or premise equipment provider.

Up until divestiture all special service circuits were installed and maintained from one end to the other. Now it is apparent that the same type of circuit needs to be tested from somewhere in between the near and far end toward both providers.

With all of the foregoing factors in mind, there has arisen an acute need for a simple yet practical test device. Previous to divestiture it was a simple matter to transpose the signal leads of a good circuit with a bad one and utilize a voltmeter to test for voltage and ground. After divestiture however, this method is no longer possible.

Further, there is no longer any method of testing which employs a technique designed to verify signaling leads by exercising or activating the premise equipment. The present invention was designed to utilize this method as well as accomplish simple testing techniques.

SUMMARY OF THE INVENTION

The present invention was conceived and designed to fulfill a need created by the 1984 telecommunication divestiture. The need was manifested at the inception of a symbolic company boundary typically referred to as a standardized demarcation point.

One of the many circuit combinations affected by the divestiture is the transmission and signaling leads used in conjunction with special service circuits, specifically, the signaling leads E, M, SB and SG such as one would find associated with PBX tie lines or special service circuits.

As is well known in the telephone industry, the SB (signal battery) and SG (signal ground) leads provide a voltage source and connection to ground, respectively, for the special service signaling circuit. The M (mouth) and E (ear) leads provide an outgoing transmission conductor and an incoming reception conductor, respectively, for the signaling circuit.

In preferred practice, the present invention would be connected to the signaling leads at a prescribed connecting point such as will be found at various designated points of presence defined as demark points. The connections to the invention are made by alligator clips on a lead for lead basis.

The object of the present invention is to provide an economical and easy to use test device which can provide an accurate indication of the condition of the signaling leads without the disadvantage of a large, bulky and expensive multiple function test set.

It is also the object of the present invention to provide a pair of dial terminals which will provide a connecting point for a dial test set and permit a technician to dial through the circuit and exercise the signaling circuit to the distant end of a dedicated PBX system.

It is another object of this invention to detect voltage presence on the equipped or closed signaling leads as well as ground on those leads that require ground.

Yet another purpose of the invention is to signal a seizure or off hook condition to the distant end through the telephone company equipment, and acknowledge seizure from the distant end.

The foregoing advantages and objectives should be clearly evident from the description to follow. In addition, the aforementioned invention presents a far more economical and less difficult alternative to testing special service circuit signaling lead statuses.

BRIEF DESCRIPTION OF THE DRAWINGS

The various details and purpose of the invention will be more fully understood when reference is made to the accompanying drawings, in which:

FIG. 3 is an isometric view of the invention with a cross sectional view of the basic parts broken away from each other.

DETAILED DESCRIPTION OF THE PREFERRED EMBODIMENT

The description of the preferred embodiment of the invention will be described herein with reference to the schematic, and exploded view and a preferred method of usage. The same reference numbers are used for the same component parts in the various drawing figures.

Figure 1:
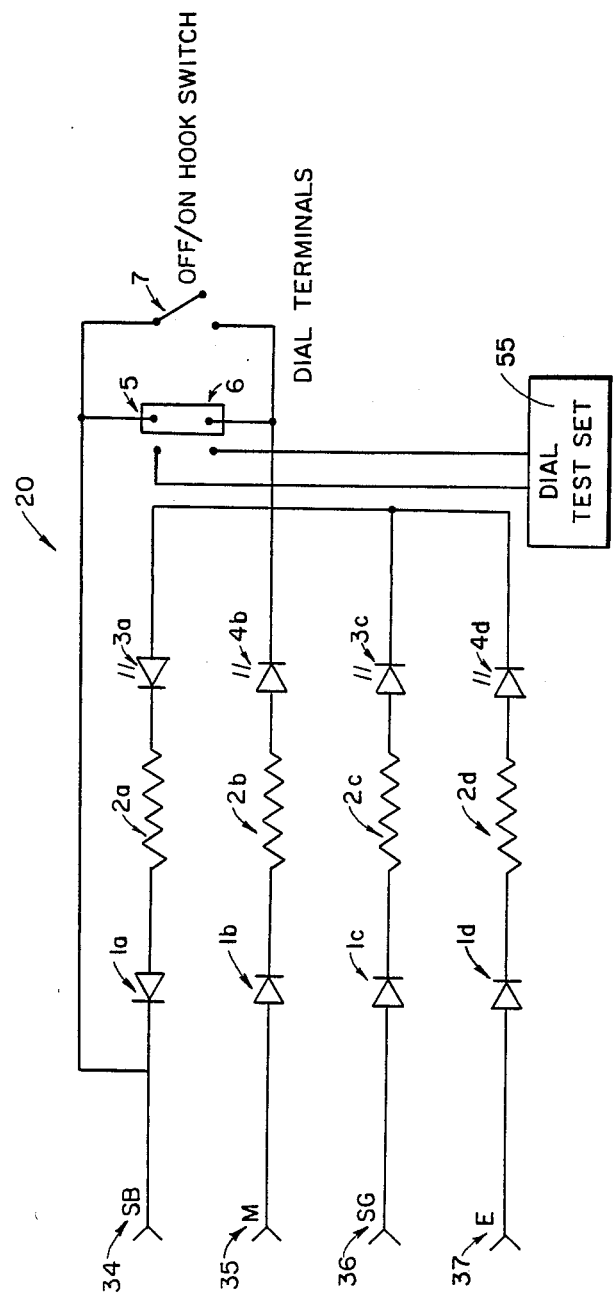
FIG. 1 is a schematic circuit diagram of the preferred embodiment of the present invention.
Figure 2:
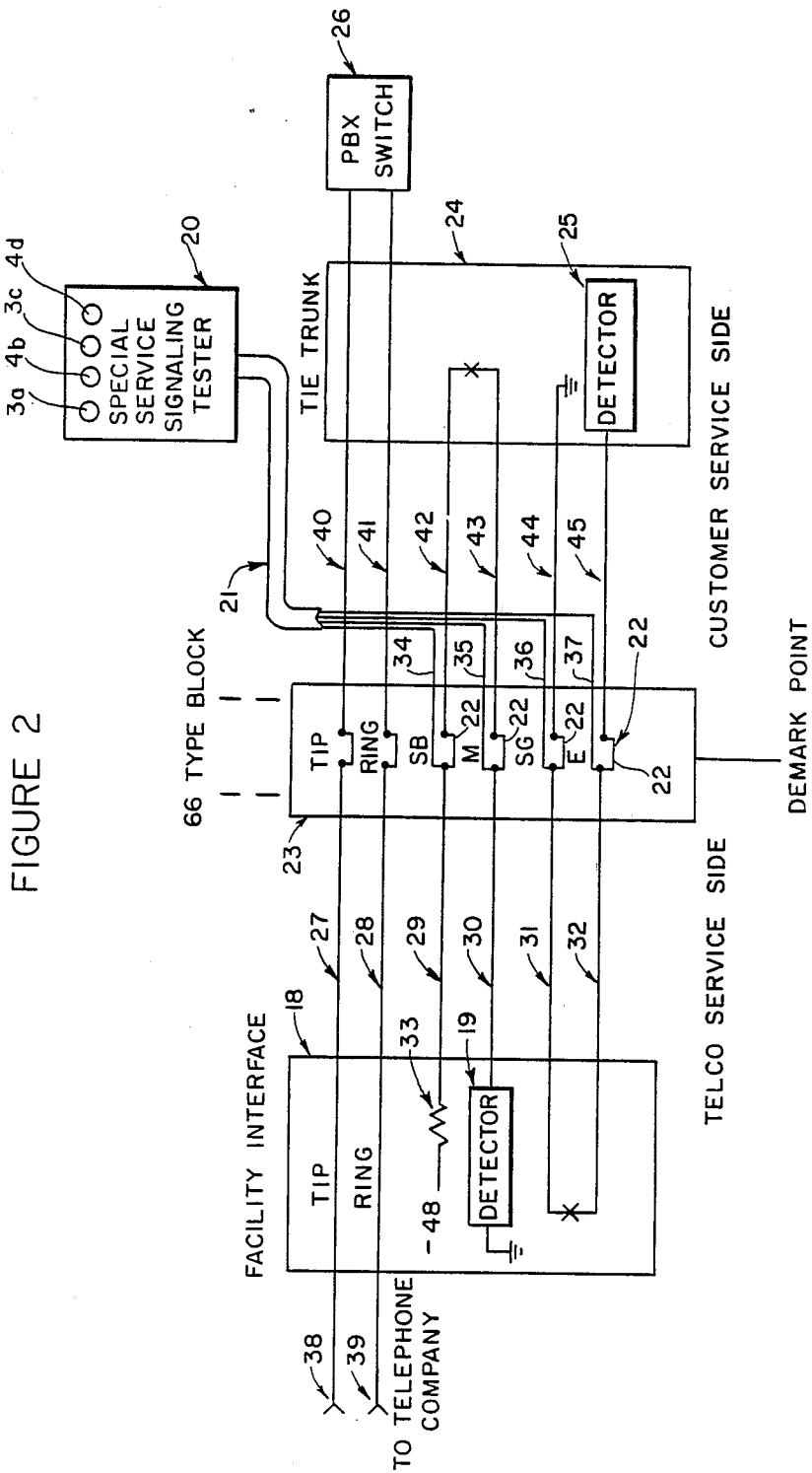
FIG. 2 is a functional diagram of the invention and a method of connecting it to either a single or paired-wire signaling E and M interface arrangement such as a PBX dial tie trunk or special service circuit.

Referring now to FIG. 1 of the drawings, there is schematically shown a preferred embodiment of a special service signaling test device 20 which may be connected to a special service circuit line's signaling leads 29, 30, 31 and 32 as shown in FIG. 2 to make signaling operational tests on telecommunications special service circuits. The special service circuit consists of two or four signaling leads 27-32 and 40-45 and one or two pairs of transmission leads 38 and 39 which are decoupled at an arbitrary point of presence at the customer premises called the demarcation point. The demarcation point consists of two access points: the customer's and the telephone company's. The test apparatus 20 has been designed to terminate PBX dial tie trunk or special service circuit signaling leads 27–32 at the demarcation point and exercise the circuit's associated line equipment. The test apparatus 20 lends itself to new installations and serves to isolate trouble in existing systems. In addition, the apparatus 20 can be powered directly from the line, thus eliminating the need for an internal power source.

The device lead designated SB 34 in FIG. 1 is provided a current path through switching means 7 and in series with LED 4b, resistance 2b and diode 1b thus comprising a means of conveying a battery condition on the M lead 35 toward the telephone company thus indicating an off-hook condition (at the customer service end) toward the telephone company. Also, dial terminals 5 and 6 are provided as access points for a dial instrument 55 in order to cause pulses on said M lead 35 and in effect pulse dialing toward the telephone company.

In addition, SB lead 34 is provided a series-parallel current path through diodes 1a and c, resistances 2a and c and LEDs 3a and c to the device lead designated SG 36 which is a ground to battery series connection and merely verifies said voltage potential existence on an interface 18 and trunk circuit 24 shown in FIG. 2. This signaling operational test well known to those skilled in the art and involves the initial determination of continuity of both the SB and SG leads 29 and 31. Continuity of both leads is indicated by illumination of the LED 3c.

Further, and also a part of the aforementioned series-parallel current path, is another current path for the SB lead 34 through diodes 1a and d, resistances 2a and d and LEDs 3a and d to a lead designated E 37 which provides a circuit to indicate an off-hook condition on the telephone company end to the customer service end) (A condition well known to those skilled in the art).

The aforementioned LEDs 3a, 4b, 3c and 4d, when lighted serve as visual indicators of the said statuses of leads SB 34, M 35, SG 36 and E 37 leads.

FIG. 2 discloses a method of connecting the special service signaling test set to a typical special service circuit. The sixty-six type terminal strip 23 provides the customary access point to which the special service signaling test set 20 may be connected to signaling leads SB 29, M 30, SG 31 and E 32.

In order for the special service signaling test set 20 to perform its intended test function, it is necessary to first remove bridging clips 22 from block 23 thus isolating SB path 42, M path 43, SG path 44 and E path 45 from SB path 29, M path 30, SG path 31 and E path 32 the latter being the signaling paths which are illustrated as under test.

SB path 29 and M path 30 are shorted by switching means 7 of FIG. 1 and provide interface 18, detector 19 with an off-hook indication which is transmitted over tip 38 and ring 39 toward the telephone company. This signaling test illuminates LED 4b. SG path 31 and E path 32 illuminate LED 3a and LED 4d, as shown in FIG. 1, in response to an off-hook from the facility interface 18 which had been transmitted over tip 38 and ring 39 from the telephone company and terminated by tie trunk 24 detector 25.

Tip 38 and ring 39 through facility interface 18; tip 27 and ring 28 through sixty-six block 23; and tip 40 and ring 41 through the trunk 24 to PBX switch 26 comprise the 2 wire transmission portion of the private line channel and provides the loop for transmitting voice, dialing, and answer/disconnect signals from one PBX to another.

FIG. 3 discloses a three dimensional view of the special service signaling test set which illustrates the various parts broken away from each other.

The plastic bottom one half 17 is connected to top one half 16 by metal attaching screws 17 which also locate and fasten printed circuit board 15 between the two halves. Said screws 12 further position modular jack connecting means 13 into a fixed cut out, and also position ring 10 and retainer 9 of strap 11 in to its fixed cut out.

Resistors and diodes 1 and 2 are mounted flush on printed circuit board 15 and are not exposed to the top side of the top enclosure 16. Led 3 and 4 however, are mounted on pad or spacer 8 and are forced through corresponding apertures so as to be visible after enclosure halves 16 and 17 are assembled.

Wiring means 14 provides a connecting path between exposed test terminal 5 and 6 and on/off hook switch 7 and circuit board 15.

The embodiment shown is not the only means of creating the invention and the sub-parts are not claimed as novel. It is the novel assembly compared to its expected application wherein my claim lies.

As many changes are possible to the embodiments of this invention using the teachings thereof, the above description and the accompanying drawings should be interpreted in the illustrative and not in the limited sense.

What is claimed is:

1. A hand held, unitary special service signaling test device to provide a visual status indication on SB, SG, E and M telephone company signaling conductors and for use with a dial test set, comprising:
   (a) a first LED connected to the SB signaling conductor and in series with parallel third and fourth LEDs connected to the SG and E signaling conductors respectively;
   (b) a second LED connected to the M signaling conductor and in series with a switching means connected to the SB signaling conductor; and
   (c) first and second terminals for connection of a dial test set across said terminals, said first terminal being connected with the SB signaling conductor, said second terminal being connected with the M signaling conductor through said second LED, whereby voltage on the SG signaling conductor illuminates said third LED when said switch means is open, voltage on the E signaling conductor illuminates said fourth LED when said switch means is open, closure of said switch means provides a voltage on the M signaling conductor and illuminates said second LED, and whereby connection of the dial test set across said first and second terminals permits application of a pulsing current on the M signaling conductor.

2. A special service signaling circuit according to claim 1 including a modular interconnecting means comprising a jack connected to the "SB", "M", "SG" and "E" conductors which facilitates the interconnecting of a modular plug into said jack and being terminated with color coded, rubber coated alligator clips.

3. The special service signaling test device of claim 1, wherein said terminals and said switch means are connected in parallel.

4. The special service signaling test device of claim 1, wherein said series connected switching means and second LED are connected in parallel with said first LED.

5. The special service signaling test device of claim 1, including a first resistor connected between the SB signaling conductor and said first LED, a second resistor connected between the M signaling conductor and said second LED, a third resistor connected between the SG signaling conductor and said third LED and a fourth resistor connected between the E signaling conductor and said fourth LED.

6. The special service signaling test device of claim 1, including a first diode connected between the SB signaling conductor and said first LED, a second diode connected between the M signaling conductor and said second LED, a third diode connected between the SG signaling conductor and said third LED and a fourth diode connected between the E signaling conductor and said fourth LED.

7. A unitary, compact and hand held test device for use on special service signaling circuits to provide status indications of telephone company SB, M, SG and E leads and for connection at a designated demarcation point comprising:
   a. a line status path establishing a current path between the SB and SG leads through a first light emitting diode and a third light emitting diode, said line status path indicating voltage presence on the SB lead and a connection to ground on the M lead;
   b. an off-hook signal detection path establishing a current path between the SB and E leads through said first light emitting diode and a fourth light emitting diode, said off-hook signal detection path detecting a voltage on the E lead to indicate an off-hook condition received from the telephone company side of the demarcation point; and
   c. an off-hook signal transmission path establishing a current path between the SB and M leads through a switch means and a second light emitting diode, said off-hook signal transmission path providing a voltage on the M lead to signal an off-hook condition on the customer side of the demarcation point.

8. The test device of claim 7, further being for use with a dial test set, said device further comprising a pulse transmission path having terminal means establishing a current path between the SB and M leads through a connectible dial test set linked by said terminal means, and through said second light emitting diode, said pulse path providing voltage pulses on the M lead to signal dialing on the customer side of the demarcation point.

9. The test device of claim 8, wherein said terminal means is connected in parallel with said switch means.

10. The test device of claim 7, wherein said fourth light emitting diode is connected in parallel with said line status path.

11. The test device of claim 7, wherein said off-hook signal transmission path is connected in parallel with said line status path and with said off-hook signal detection path.

12. The test device of claim 7, wherein said line status path further comprises a first resistor and a first diode connected between said first light emitting diode and the SB lead, and a third resistor and third diode connected between said third light emitting diode and the M lead, and wherein said off-hook signal path further comprises a fourth resistor and fourth diode connected between said fourth light emitting diode and the E lead, and wherein said off-hook signal transmission path further comprises a second resistor and a second diode connected between said second light emitting diode and the M lead.

13. The test device of claim 7 including a modular interconnecting means comprising a jack connected to the SB, M, SG and E leads which facilitates the interconnecting of a modular plug into said jack and being terminated with color coded, rubber coated alligator clips.

14. A unitary, compact and hand held test device for use on special service signaling circuits to provide status indications of telephone company SB, M, SG and E leads, for connection at a designated demarcation point and for use with a dial test set, said device comprising:
   a. a line status path establishing a current path between the SB and SG leads through a first diode, a first resistor, a first light emitting diode, a third light emitting diode, a third resistor and a third diode, said line status path indicating voltage presence on the SB lead and a connection to ground on the SG lead;
   b. an off-hook signal detection path establishing a current path between the SB and E leads through said first diode, said first resistor, said first light emitting diode, a fourth light emitting diode, a fourth resistor and a fourth diode, said off-hook signal detection path detecting a voltage on the E lead to indicate an off-hook condition received from the telephone company side of the demarcation point;
   c. an off-hook signal transmission path establishing a current path between the SB and M leads through a switch means, a second light emitting diode, a second resistor and a second diode, said second light emitting diode being connected to the SB lead at a node between the SB lead and said first diode, said off-hook signal transmission path providing a voltage on the M lead to signal an off-hook condition on the customer side of the demarcation point; and
   d. a pulse transmission path having terminal means establishing a current path between the SB and M leads through the connectible dial test set linked by said terminal means, said second light emitting diode, said second resistor and said second diode, said pulse path providing voltage pulses on the M lead to signal dialing on the customer side of the demarcation point.

15. The test device of claim 14, wherein said fourth light emitting diode, resistor, and diode are connected in parallel with said line status path.

16. The test device of claim 14, wherein said terminal means are connected in parallel with said switch means.

17. The test device of claim 14, wherein said off-hook signal transmission path and said pulse transmission path are connected in parallel with said line status path.

18. The test device of claim 14, including a modular interconnecting means comprising a jack connected to the SB, M, SG and E leads which facilitates the interconnecting of a modular plug into said jack and being terminated with color coded, rubber coated alligator clips.

* * * * *